(12) United States Patent
Payne et al.

(10) Patent No.: US 6,718,107 B1
(45) Date of Patent: Apr. 6, 2004

(54) OPTICAL FIBRE FILTERS

(75) Inventors: David Neil Payne, Hamble (GB); Liang Dong, New York, NY (US); Beatriz Ortega Tamarit, Valencia (ES)

(73) Assignee: The University of Southampton, Southampton (GB)

( * ) Notice: Subject to any disclaimer, the term of this patent is extended or adjusted under 35 U.S.C. 154(b) by 381 days.

(21) Appl. No.: 09/637,236

(22) Filed: Aug. 11, 2000

Related U.S. Application Data (63) Continuation of application No. PCT/GB99/00461, filed on Feb. 15, 1999.

(30) Foreign Application Priority Data

Feb. 16, 1998 (GB) .............................. 9803275

(51) Int. Cl.⁷ .................................. G02B 6/02
(52) U.S. Cl. ..................... 385/126; 385/43; 385/48
(58) Field of Search ............... 385/43, 126, 48

(56) References Cited

U.S. PATENT DOCUMENTS 4,315,666 A * 2/1982 Hicks, Jr. ............... 385/125
RE33,296 E * 8/1990 Stowe et al. ............. 156/166

FOREIGN PATENT DOCUMENTS

| EP | 0 417 441 | 3/1991 |
| EP | 0 703 475 | 3/1996 |
| GB | 2 183 866 | 6/1987 |

OTHER PUBLICATIONS

Ortega et al., "Accurate Tuning of Mismatched Twin–Core Fiber Filters", Optics Letters, vol. 23, No. 16, Aug. 15, 1998, pp. 1277–1279, XP000783079.

Tjugiarto et al., "Bandpass Filtering Effect in Tapered Asymmetrical Twin–Core Optical Fibres", Electronics Letters, vol. 29, No. 12, Jun. 10, 1993, pp. 1077–1078.

* cited by examiner

Primary Examiner—Hung N. Ngo
(74) Attorney, Agent, or Firm—Renner, Otto, Boisselle & Sklar, LLP (57) ABSTRACT

A method of fabricating a band-processing optical fibre filter having a center wavelength $\lambda_0'$, the method comprises (i) radius-reducing a mismatched multi-core optical fibre having a core phase matching wavelength (before radius reduction) of $\lambda_0$ and a radius (before radius reduction) of $a_0$, to a reduced radius $Ra_0$, where $R=\lambda_0'/\lambda_0$; and (ii) providing light input and output connections to a section of the radius-reduced multi-core fibre so that input light is launched into one of the cores of the multi-core fibre section and output light emerges from one of the cores of the multi-core fibre section.

17 Claims, 8 Drawing Sheets

OPTICAL FIBRE FILTERS

This application is a continuation of International Application No. PCT/GB99/00461 filed Feb. 15, 1999, which is hereby incorporated by reference.

BACKGROUND OF THE INVENTION

This invention relates to optical fibre filters.

There are many applications for optical fibre band-pass and band-stop filters in optical fibre systems, allowing spectral filtering of optical signals.

An example of the use of such devices is the filtering of amplified spontaneous emission after an erbium-doped fibre amplifier. Current commercially available devices, e.g. devices based on thin film technology, fibre Fabry-Perot interferometers and, recently, fibre gratings in combination with circulators, are in one way or another based on some bulk optic devices, and therefore have high insertion losses and are expensive.

Several all-fibre based filters have been proposed, one based on a mismatched twin-core (TC) fibre designed to phase-match at the filtering wavelength [see publication references 1,2,3]. Grating assisted coupling in a mismatched twin-core fibre can also be used to implement a band-pass filter [4,5]. However, these techniques require a bespoke fibre for each possible centre wavelength, and therefore a large stock of fibre must be built up. There has not been a technique which offers the required high quality performance and flexibility and an easy implementation of filters at any desired wavelength.

Recently, due to the surge of interest in wavelength-division-multiplexing systems, spectral dependent loss with designed profiles has become a very interesting topic for many who want to achieve a wide bandwidth Er-doped optical fibre amplifier by gain shaping. The dominant technology for achieving this so far has been long period photosensitive gratings written in fibres using a UV laser to couple a guided mode into a cladding mode [6]. This method allows accurate control of the filter response and therefore can implement the complicated spectral loss profiles required. However, the response of these gratings is highly sensitive to any index change of the core. This can be caused by a change of temperature, strain or decay of the photo-sensitive index change and out-diffusion of hydrogen, should low temperature hydrogenation be used. This makes it very difficult to predict the final device response during fabrication and, worse still, other stabilisation technologies have to be employed to maintain the same grating response at different operational conditions, i.e. a change of temperatures or strain. To reduce the temperature sensitivity, specially designed fibres have to be used [7,8].

So, there is a need for a fibre-based filter having reproducible optical characteristics.

SUMMARY OF THE INVENTION

This invention provides a method of fabricating a band-processing optical fibre filter having a centre wavelength $\lambda_0'$, the method comprising the steps of:

(i) radius-reducing a mismatched multi-core optical fibre having a core phase matching wavelength (before radius reduction) of $\lambda_0$ and a radius (before radius reduction) of $a_0$, to a reduced radius $Ra_0$, where $R=\lambda_0'/\lambda_0$; and (ii) providing light input and output connections to a section of the radius-reduced multi-core fibre, so that input light is launched into one of the cores of the multi-core fibre section and output light emerges from one of the cores of the multi-core fibre section.

The invention provides an elegantly simple band-processing (e.g. band-pass or band-stop) filter fabrication method and a corresponding filter.

The invention recognises that the coupling between cores of a multi-core optical fibre is (a) highly wavelength dependent, and (b) highly dependent on the core radius in the multi-core fibre. So, if a band-pass or band-stop filter is produced by coupling light from an input core of a multi-core fibre to another core and outputting light from the input or another core, the wavelength range at which this takes place can be controlled by adjusting the radius of the cores of the multi-core fibre.

The invention further recognises that an elegant and convenient way of doing this is to reduce the radius of the multi-core fibre, e.g. by a thermal process. This provides a reduction in the overall fibre radius which can be measured or predicted easily, but more importantly provides a corresponding reduction in the radius of each core of the multi-core fibre. So, by achieving a desired degree of radius reduction of the fibre as a whole, the desired core radius can easily be achieved.

This is quite different to the techniques described, for example, in publication reference [2] where the fibre initially has cores so far separated that substantially no coupling occurs. A radius reduction from 140 $\mu$m to 38 $\mu$m is required in that reference to move the cut-off wavelength from 1 $\mu$m to 980 nm.

The skilled man will appreciate that a mismatched multi-core fibre is one in which the effective radius and the effective refractive index are both different between cores. The skilled man will also appreciate that the term "filter" does not exclude devices with a net gain at at least some wavelengths. The term "filter" simply implies a device having a wavelength-dependent response. Similarly, the term "centre wavelength" does not necessarily imply a symmetrical wavelength-dependent response. It is simply a term used widely in the art to refer to a wavelength substantially at the (positive or negative) peak of the device's response.

Embodiments of the invention can provide a highly reproducible and accurate way of tuning the coupling wavelength of a mismatched TC fibre, allowing the coupling wavelength to be accurately positioned at any wavelength over a few hundred nanometre wavelength range. The diameter of the TC fibre used is reduced on a coupler rig. The highly controllable reduction of TC fibre diameter is used to adjust the coupling wavelength of the TC fibre.

In prototype embodiments, a tuning range of 550 nm has been demonstrated, only to be limited by the measurement set-up used, and not by the technique itself.

Using embodiments of the invention, band-pass and band-stop filters of very high spectral quality have been implemented as prototypes to demonstrate the potential of the technique. The accurate tuning technique, in combination with filter strength (or extinction ratio) tuning by adjusting the length of the TC fibre, enables spectral dependent loss of various profiles to be implemented by having several of the filters in series, demonstrating the accuracy and flexibility of the technique.

The filter response is intrinsically very stable in terms of temperature change and strain change, allowing easy packaging. This is because the length of the filter is an odd multiple (e.g. 1) of the coupling length between the cores—generally of the order of a centimetre or more. Fractional changes in length due to temperature or strain variations simply move the device slightly away from the coupling length (this does not change the coupling wavelength significantly but can affect the filter strength slightly). A main benefit is that temperature and strain have very little effect on the core parameters. In contrast, in grating devices they would change the grating pitch and in interferometric devices they would change the resonance of the device, both of which are very much more sensitive to tiny length changes. So, devices made according to the present invention can be much less sensitive to environmental conditions than previous interferometric or grating-based filters.

The invention also provides a band-processing optical fibre filter having a centre wavelength $\lambda_0'$, the filter comprising:

a section of radius-reduced mismatched multi-core optical fibre having a core phase matching wavelength (before radius reduction) of $\lambda_0$ and a radius (before radius reduction) of $a_0$, the section being radius-reduced to a reduced radius $Ra_0$, where $R = \lambda_0'/\lambda_0$, and (ii) light input and output connections to the multi-core fibre section arranged so that input light is launched into one of the cores of the multi-core fibre section and output light emerges from one of the cores of the multi-core fibre section.

BRIEF DESCRIPTION OF THE DRAWINGS

The invention will now be described by way of example with reference to the accompanying drawings, throughout which like parts are referred to by like references, and in which.

DETAILED DESCRIPTION

Figure 1:
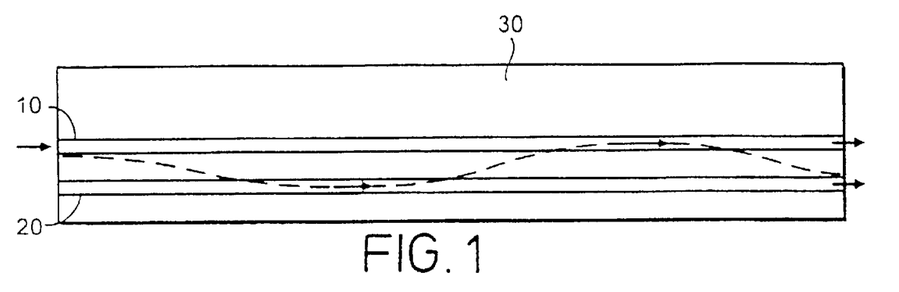
FIG. 1 schematically illustrates a twin core fibre.

FIG. 1 schematically illustrates a twin core optical fibre formed of a central core 10, an off-axis core 20 and a cladding region 30. The core 10 is central within the fibre just to ease splicing to single core fibres.

The cores are mismatched with respect to one another. The technical significance of this will be discussed in detail below, but for the time being it is noted that the effect of the mismatch is that light launched into one of the cores (e.g. the core 10) at a coupling wavelength is coupled across to the other core during propagation along a length of fibre referred to as the coupling length ($L_C$). This transfer is shown schematically in FIG. 1 by a dotted line. The coupling length is typically of the order of a few mm to a few cm of fibre, but this of course depends on many factors and properties of the fibre such as the coupling strength and the size of the optical mode.

Once the light has been coupled from the fibre 10 to the fibre 20, it starts to be coupled back into the fibre 10, again over of the course of a coupling length. This to-and-fro coupling is illustrated in FIG. 1. The fibre section shown in FIG. 1 is about 2.5 $L_C$ long, so that light emerges from both cores at the output end of the fibre.

Figure 2:
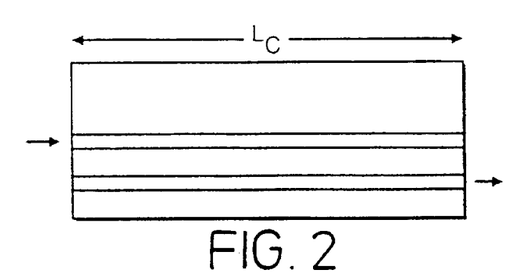
FIG. 2 schematically illustrates a coupling length in a twin core fibre.

FIG. 2 illustrates a section of fibre whose length is $L_C$. Here, light launched into the central core at the coupling wavelength is entirely coupled into the off-axis core.

Figure 12:
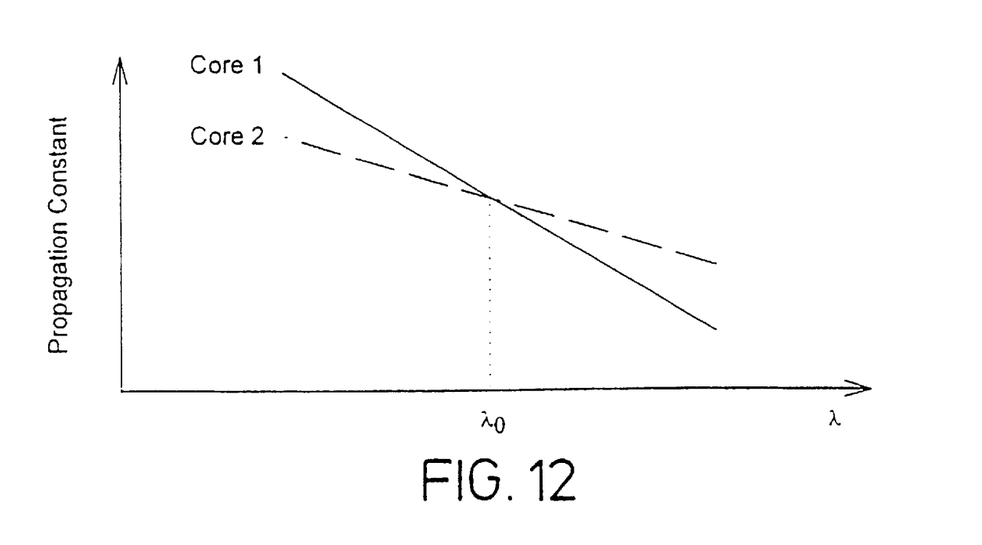
FIG. 12 schematically illustrates the propagation constants of a TC fibre.

The theory behind this coupling process will now be described with particular reference to FIG. 12.

In a mismatched TC fibre with cores with respective propagation constants $\beta_1$ and $\beta_2$ ($\beta_1 > \beta_2$), core radii $\rho_1$ and $\rho_2$, and relative index differences $\Delta_1$ and $\Delta_2$, the mismatching between the two cores is usually sufficient large to suppress any intrinsic coupling between the two cores-when the phase-matching condition is not met.

In such a fibre when not phase-matched, the fundamental normal modes of the TC fibre (odd and even modes), resemble very closely each of the core modes when the two cores are in isolation, and we can therefore use $\beta_1$ and $\beta_2$ as the propagation constants of the two modes while maintaining a good accuracy. This dramatically simplifies the analysis of such structures.

The TC fibre can be designed to achieve phase-matching at any wavelength $\lambda_0$, where the two propagation constants are equal and $\beta_1(\lambda_0) = \beta_2(\lambda_0)$. FIG. 12 illustrates the relationship between the propagation constants for the two cores and wavelength $\lambda$. The wavelength is related to a quantity V to be discussed below by the following equation:

$$V = \frac{2\pi\rho \cdot NA}{\lambda}$$

Coupling happens over only a very small wavelength range. Therefore at $\lambda_0$:

$$\beta_1(\lambda_0) = \frac{1}{\rho_1}\sqrt{\frac{V_1^2}{2\Delta_1} - U_1^2} = \beta_0$$

$$\beta_2(\lambda_0) = \frac{1}{\rho_2}\sqrt{\frac{V_2^2}{2\Delta_2} - U_2^2} = \beta_0$$

$V_1$, $V_2$, $U_1$, and $U_2$ are as normally defined in a optical fibre respectively for the two cores at the coupling wavelength $\lambda_0$. It is clear that if the diameter of the fibre is reduced from $a_0$ to $a_0' = Ra_0$, then the two core radii become respectively, $\rho_1' = R\rho_1$, and $\rho_2' = R\rho_2$. The coupling wavelength will be changed to $\lambda_0'$ with the new propagation constant at the coupling being $\beta_0' = \beta_0/R$. $V_1$, $V_1$, $U_1$ and $U_2$ will remain the same. It is easy to work out the new coupling wavelength $\lambda_0'$.

$$\lambda_0' = R\lambda_0$$

Figure 3:
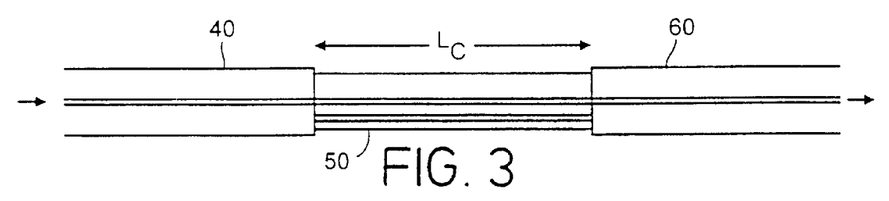
FIG. 3 schematically illustrates a band-stop filter.

These properties of the of the twin core fibre can be used to form band-pass and band-stop filters. FIG. 3 illustrates such a band-stop filter.

In FIG. 3, light from a single core fibre 40 is launched into the central core of a section of radius-reduced twin core fibre 50 having a length $L_C$, and light from the central core of the twin core fibre 50 passes into an output single core fibre 60.

The twin core fibre 50 is formed from fibre stock having an initial coupling wavelength $\lambda_0$. That fibre is then radius-reduced to change the fibre radius by a factor R, so that the new (reduced) radius $a_0' = Ra_0$, where $a_0$ was the radius before the radius-reducing process. The new coupling wavelength $\lambda_0'$ is then simply equal to $R\lambda_0$.

Figure 4:
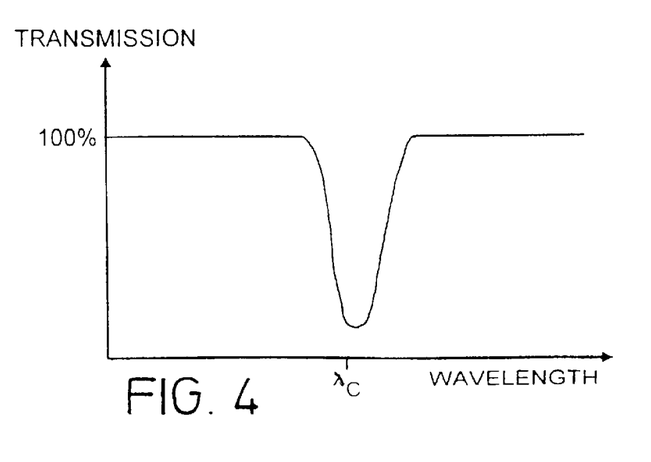
FIG. 4 schematically illustrates the response of the filter of FIG. 3.

FIG. 4 schematically illustrates the response of this filter. At wavelengths away from the coupling wavelength $\lambda_0'$, light simply passes through the system without coupling to the off-axis core of the twin core fibre. The transmission at wavelengths away from the coupling wavelength is therefore substantially 100%.

At the coupling wavelength $\lambda_0'$, however, light launched into the twin core fibre section 50 couples across to its off-axis core and so does not reach the output single core fibre 60. Accordingly, at and close to the coupling wavelength there is a sharp drop in transmission. This therefore forms a band-stop filter.

So, for a given fibre stock having an initial coupling wavelength (measurable using standard techniques), the degree of radius reduction R required to produce a filter having a lower coupling wavelength can easily be calculated as described above. The radius reduction can be performed using a conventional fused coupler rig, although for particularly high resolution control of the radius (e.g. for some of the profiles illustrated in FIGS. 18 to 20) a laser heating arrangement can be used to heat local very small areas of the fibre to be stretched. The actual degree of radius reduction applied, R, can then be predicted from the fibre extension applied and the length of the radius-reduced region (this prediction is a facility available on some current computer-controlled rigs) or simply measured by examining the radius-reduced fibre using a travelling microscope or similar instrument. Once the desired degree of radius reduction R has been achieved, a substantially uniform diameter section is spliced into some single core fibre sections as described, to form the filter. This provides a controllable and repeatable process for producing filters at a desired wavelength.

Figure 5:
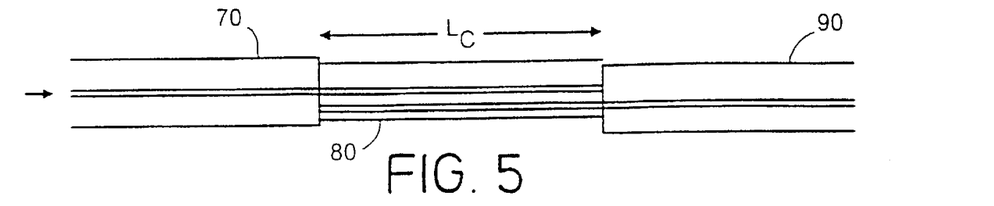
FIG. 5 schematically illustrates a band-pass filter.

FIG. 5 schematically illustrates a band-pass filter formed of an input single core fibre section 70, a radius-reduced twin core fibre section 80 and an output single core fibre section 90. The input section 70 is coupled to the central core of the twin core section 80, and the output section 90 is coupled to the off-axis core of the twin core section 80.

Figure 6:
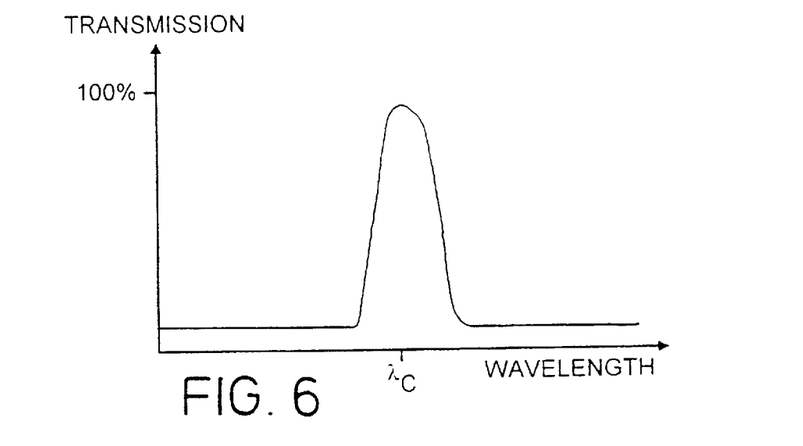
FIG. 6 schematically illustrates the response of the filter of FIG. 5.

The response of the filter of FIG. 5 is schematically shown in FIG. 6. At the coupling wavelength, light launched into the central core of the section 80 couples across to the off-axis core and so emerges into the output fibre 90. Therefore, at about the coupling wavelength, the transmission is substantially 100%. At other wavelengths, light remains in the central core of the twin core fibre section 80 and so does not emerge into the output fibre 90. This therefore forms a band-pass filter.

Measured responses corresponding to FIGS. 4 and 6 but for real prototype filters are illustrated in FIG. 2

Figure 7:
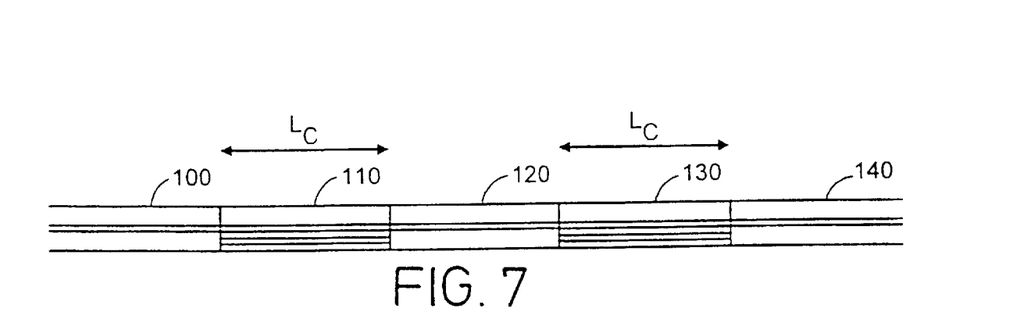
FIG. 7 schematically illustrates a series arrangement of two band-stop filters.

FIG. 7 schematically illustrates a series arrangement of two band-stop filters. An input fibre 100 is coupled to the central core of a first twin core section 110, the central core of which is coupled to a linking section of single core fibre 110. The linking section 120 is coupled to the central core of a second twin core fibre section 130, the central core of which is coupled to an output fibre 140. The wavelength response of such a composite filter will be basically the same as that of the filter of FIG. 3, but more complex filter responses can be implemented. Further sections can of course be cascaded in this way.

Figure 8:
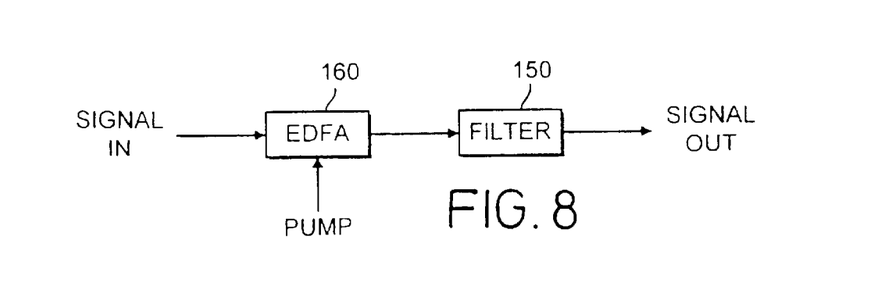
FIG. 8 schematically illustrates a series arrangement of a band-stop filter and an erbium-doped fibre amplifier (EDFA)

One use of these filters is to equalise the gain of an erbium-doped fibre amplifier (EDFA). FIG. 8 schematically illustrates a series arrangement of a band-stop filter 150 and an EDFA 160.

Figure 9:
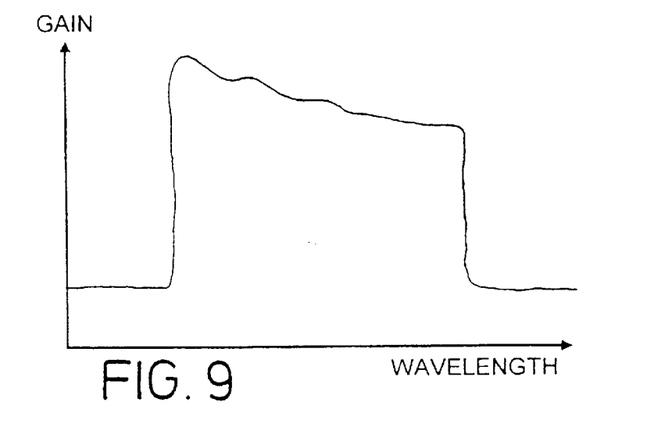
FIG. 9 schematically illustrates the gain profile of an EDFA.

EDFAs typically have gain profiles which are far from being flat. FIG. 9 schematically illustrates a hypothetical example of an EDFA gain profile.

Figure 10:
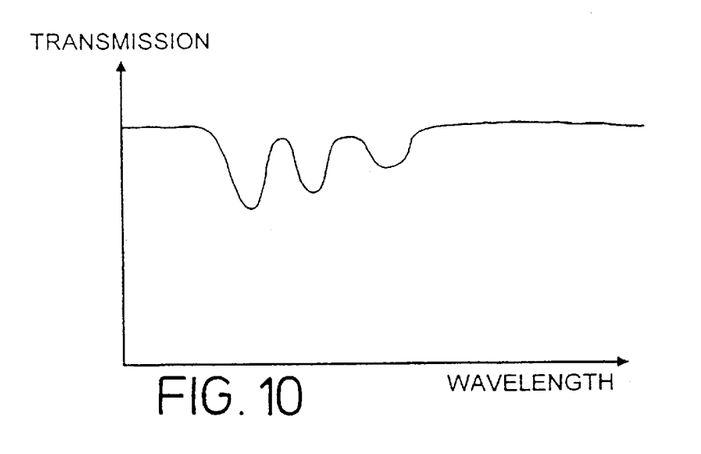
FIG. 10 schematically illustrates the response of an appropriate series-connected band-stop filter, FIG. 11 schematically illustrates the resulting gain profile of the series-connected arrangement of FIG. 8.
Figure 11:
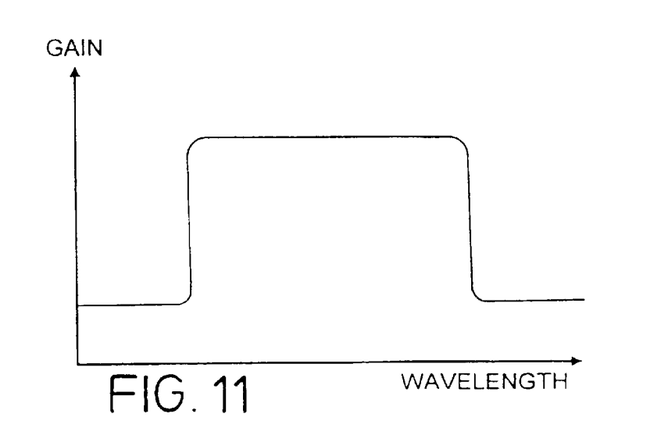

For wavelength division multiplexing applications, it is far preferable to have a flat gain profile. Accordingly, to equalise the profile of FIG. 9, one or more band-stop filters can be arranged to provide a profile substantially the inverse of the irregularities in the EDFA's gain profile. Such an arrangement is shown schematically in FIG. 10, where three band-stop filters are used to provide a composite transmission profile roughly the inverse of the gain profile of FIG. 9. FIG. 11 shows (in an ideal case) the composite gain profile of the arrangement of FIG. 8 which would result.

Prototype embodiments, and tests performed on them, will now be described.

For the TC fibre used in prototype embodiments of the invention, one core is placed in the centre of the fibre to facilitate splicing. The coupling wavelength of the original fibre is at 1.394 μm. The fibre has a cladding diameter of 125 μm. The radius reduction of the TC fibre is done on a coupler rig with an oxygen butane burner and a computer controlled linear translation stage. During the radius-reducing process, the burner traverses to-and-fro over a distance of up to 7 cm at a speed of 5 mm/s. The translation stage stretches the fibre at a rate of 0.05 mm/s. The process is stopped once the required elongation is reached to give a desired radius reduction ratio.

Only the centre part of the radius-reduced fibre of guaranteed uniform diameter is used. It is subsequently cleaved and the centre core of the radius-reduced TC fibre is spliced to another single core (SC) fibre. White light from a tungsten lamp is launched into the SC fibre, the output from the two cores of the TC fibre is then measured. This is done by butting the cleaved end of the radius-reduced TC fibre to a SC fibre on a manual fusion splicer. The length of radius-reduced TC is adjusted by subsequent cleaving to achieve a desired coupling strength of any value up to 100%. This second end of the TC fibre can then be spliced to another SC fibre. To achieve a band-pass filter, the offset core is spliced to the SC fibre. To achieve band-stop filter, the centre core is spliced.

A prototype filter produced in this way was found to have a temperature sensitivity of −0.26 nm/100° C. and a strain sensitivity of less than 0.075 nm/mStrain[1] at 1.55 μm (the limit of the resolution of the measuring arrangement used—theoretically it could be an order of magnitude better). Both of these specifications indicate improved environmental stability over a fibre Bragg grating (~1.0 nm/100° C. and ~1.2 nm/mStrain at 1.55 μm). The bandwidth of the filters is determined by the design of the fibre, although multiple coupling cycles and/or cascading identical filter sections can be used to reduce the bandwidth for the same fibre. Currently the FWHM bandwidth achieved is ~15 nm, but this should be easily reduced to ~5 nm by using a TC fibre with a larger propagation constant crossing angle on a propagation constant verses λ curve (see FIG. 12).

[1] the term "mStrain" represents a fractional strain of $10^{-3}$.

Figure 13:
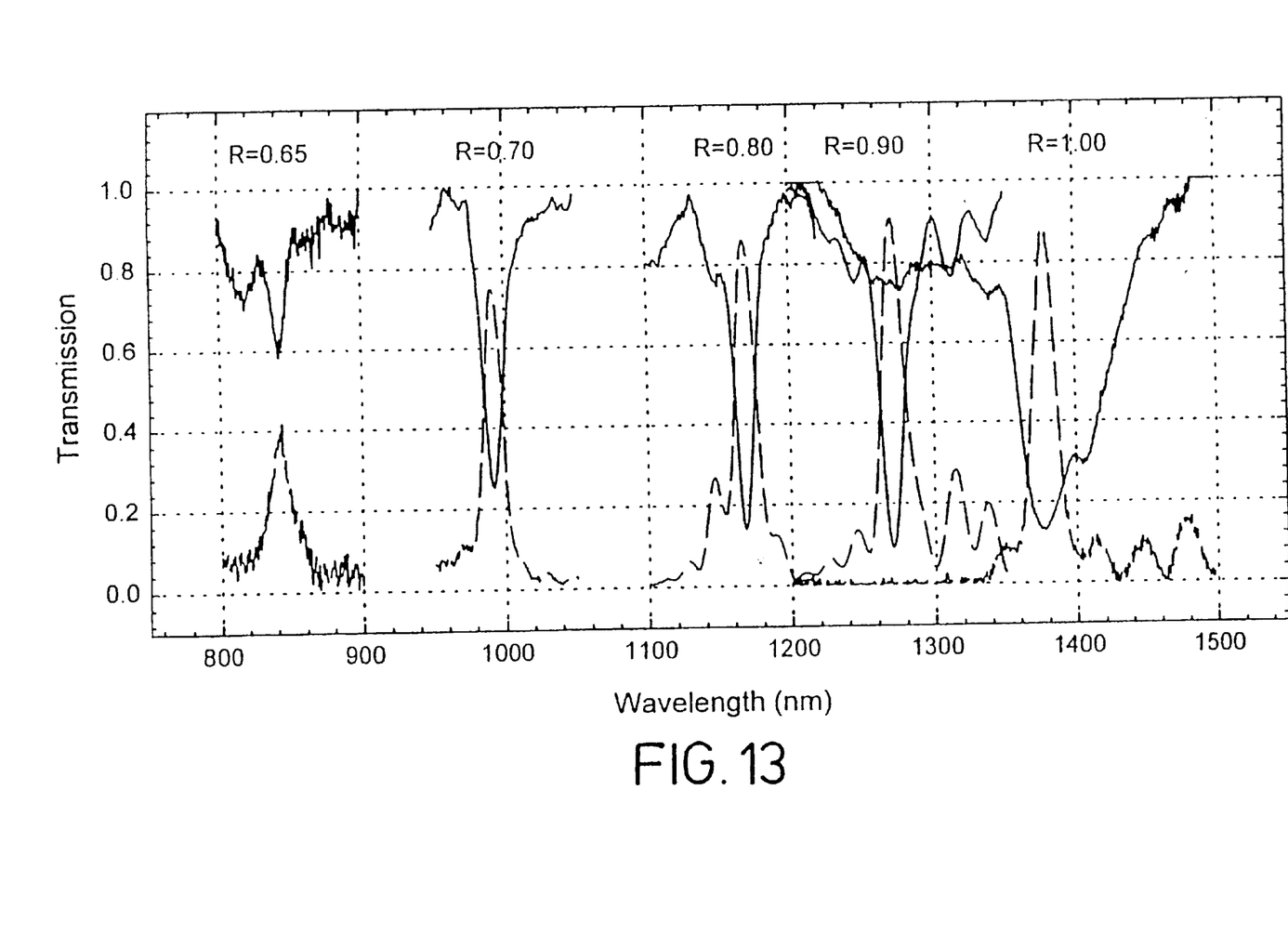
FIG. 13 schematically illustrates filter characteristic at various radius reduction ratios.
Figure 14:
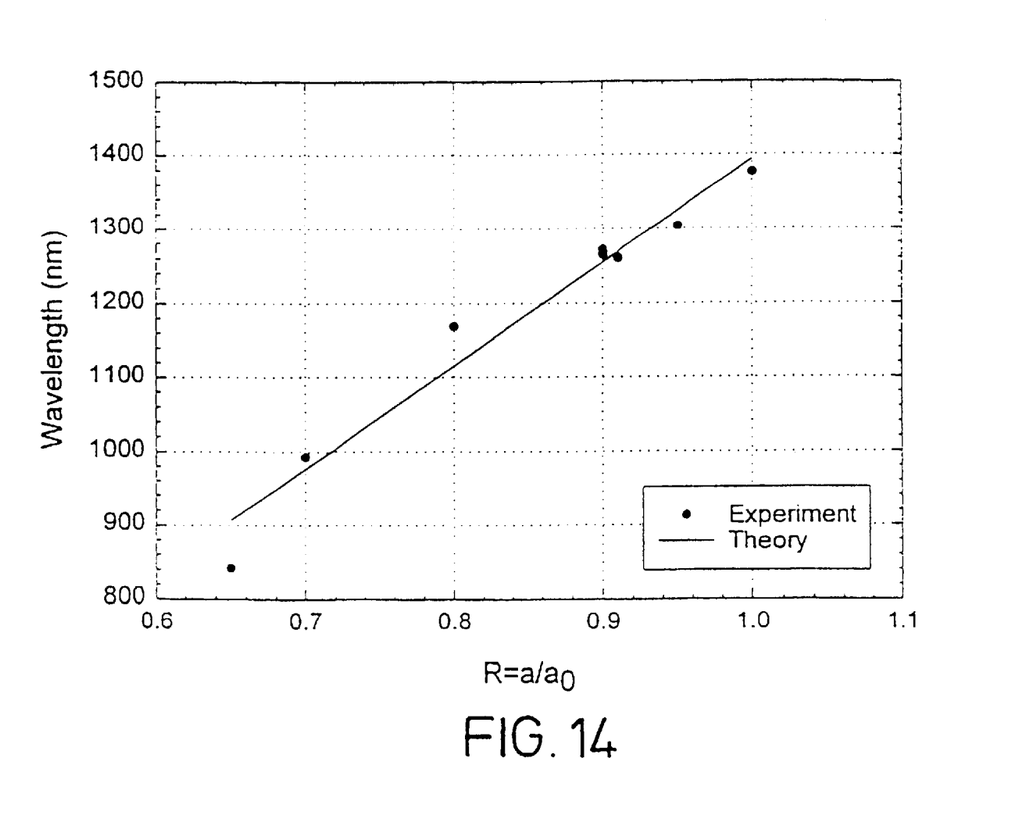
FIG. 14 schematically illustrates a tuning curve of a TC filter.

A typical output from both cores of the TC fibre at different values of R is plotted in FIG. 13. It is clear that a tuning range of at least 550 nm is easily achieved with high quality characteristics. The upper limit is set by the coupling wavelength of the original fibre. This can be made to be ~1.6 μm to cover any or most wavelengths up to 1.6 μm. (from the description earlier it can be seen that the filter centre wavelength will be no higher than the initial coupling wavelength of the twin core fibre). A length of 1 to 2 cm of the TC fibre is required achieve 100% coupling and the FWHM bandwidth of the filter is typically 15 nm. The tuning curve is give in FIG. 14, along with the theoretical prediction in solid line.

Figure 15:
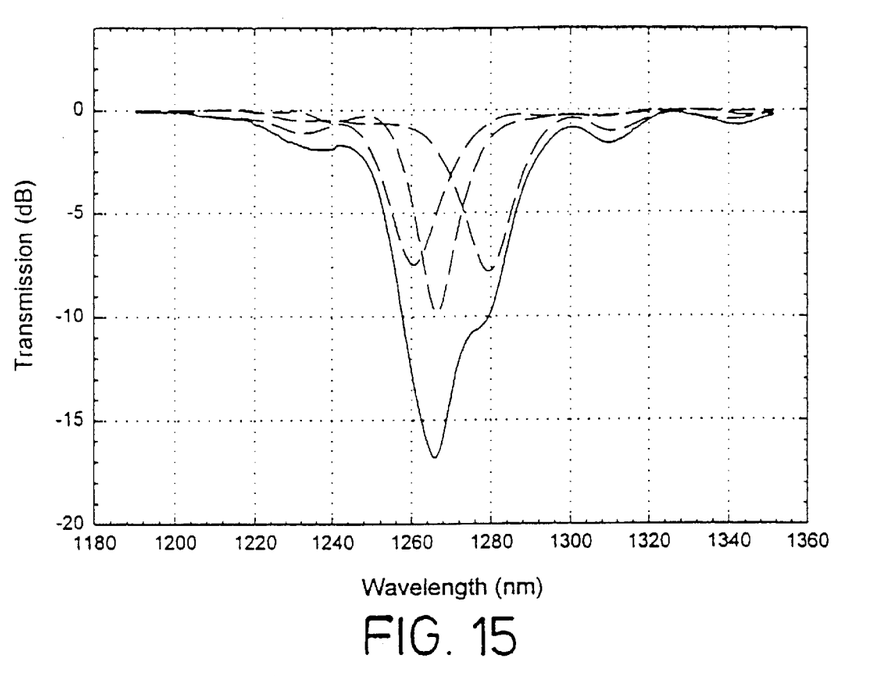
FIG. 15 schematically illustrates a loss filter made of three TC filters.

To demonstrate the controllability of the process, three filters were made with slightly overlapping profile to construct a complex coupling profile, using the radius reduction ratio to control the centre wavelength and the length of the radius-reduced TC fibre to control filter strength. A complex loss spectrum for gain-flattening erbium-doped fibre amplifiers can be constructed this way by putting a few of the filters in series (as described with reference to FIGS. 7 to 11 above). A measured complex loss spectrum made by three filters is shown in FIG. 15.

It is possible to work out simple formulae for calculating the temperature and strain sensitivity of the coupling wavelength, if we assume the two cores have the same strain or thermal optic coefficients and ignore the small effect on $U_1$ and $U_2$ resulting from a change in $V_1$ and $V_2$. If we assume the $\Delta_1$ and $\Delta_2$ are changed by $\partial\Delta_1$ and $\partial\Delta_2$ respectively by a change in temperature or strain, and $k=\partial\Delta_1/\Delta_1=\partial\Delta_2/\Delta_2$ the change in $\lambda_0$ can be easily worked out to be, $$\frac{\partial\lambda_0}{\lambda_0} = -\frac{1}{2}k$$

For a change in temperature, $k=\xi_{c0}-\xi_{cl}$, where $\xi_{c0}$ and $\xi_{cl}$ are respective thermal-optic coefficients for the core and cladding glass. In the case of strain change, $k=\chi_{c0}-\chi_{cl}$, where $\chi_{c0}$ and $\chi_{cl}$ are the respective effective photo-elastic coefficients for the core and cladding glass. We use the thermal-optic coefficient in a 8 mol % germanosilicate glass at 1.3 $\mu$m and 250° C. [9] for the core, $\xi_{c0}=8.17\times10^{-6}$, and for the fused silica cladding at 1.47 $\mu$m, $\xi_{c1}=1.15\times10^{-5}$ [10]. This gives $\partial\lambda_0/\lambda_0=1.7\times10^{-6}$, i.e. 0.26 nm/100° C. at 1550 nm. For silica, the effective photo-elastic coefficient is $\chi_{c1}=-0.22$. We deduced from the measurement of Bragg grating strain sensitivity in ref [11] the effective photo-elastic coefficient for germanium-doped silica glass, $\chi_{c0}=-0.23$. This gives $\partial\lambda_0/\lambda_0=5\times10^{-6}$/mStrain, i.e. $7.75\times10^{-3}$nm/mStrain.

Figure 16:
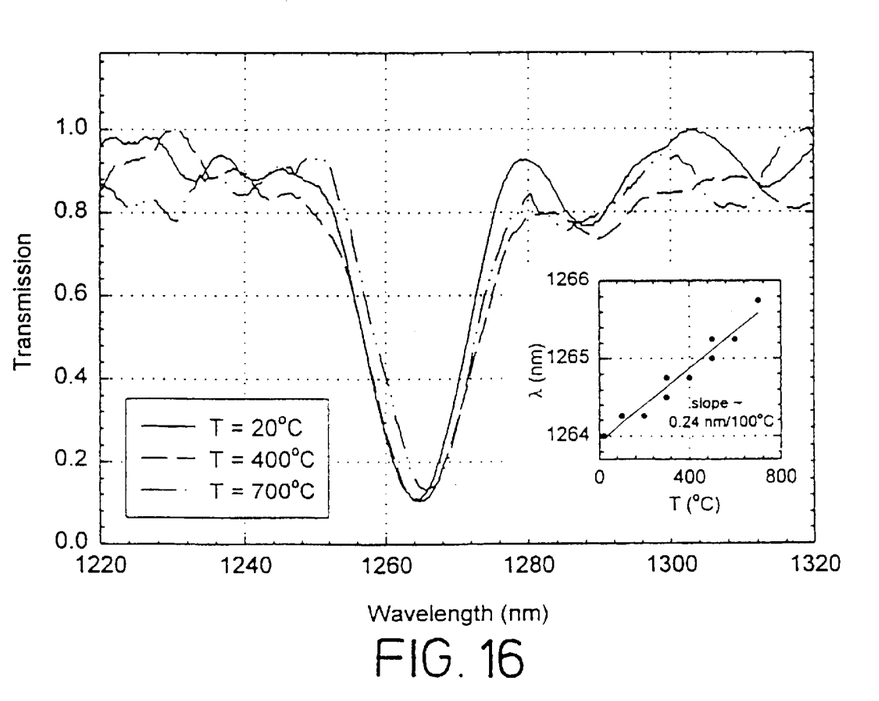
FIG. 16 schematically illustrates the temperature sensitivity of a TC fibre filter.
Figure 17:
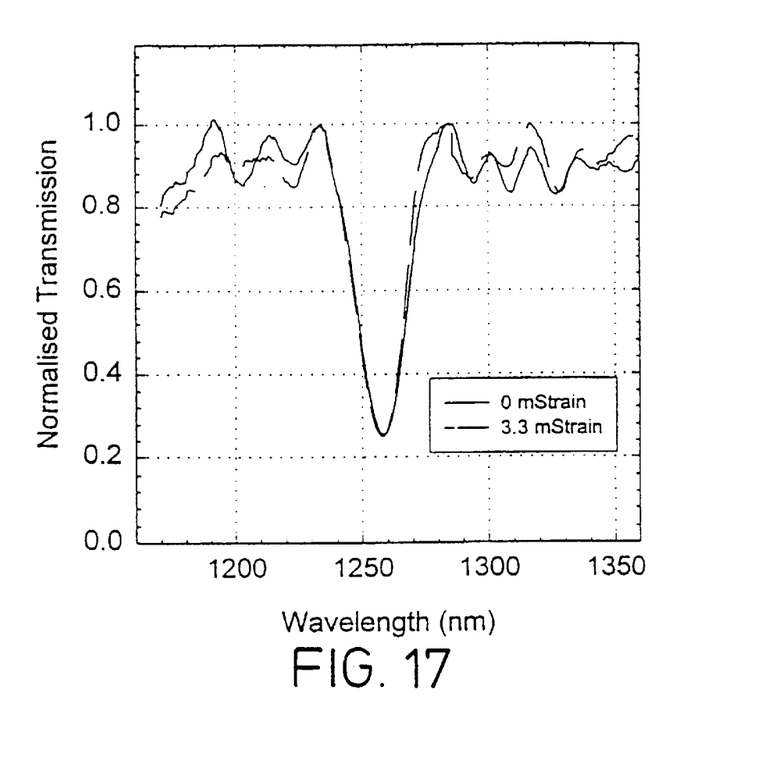
FIG. 17 schematically illustrates the strain sensitivity of a TC fibre filter.

To confirm the predicted temperature and strain stability, a filter was put in a tube furnace and was heated to 700° C. with its transmission spectrum monitored. Three such spectra at 20° C., 400° C. and 700° C. are shown in FIG. 16, demonstrating the highly stable nature of the device operating at various temperatures, both in wavelength and strength. A slope of 0.24 nm/100° C. was measured (inset in FIG. 16), very close to the predicted 0.21 nm/100° C. at this wavelength. The transmission of a filter at zero strain (broken line) and 3.3 mStrain (solid line) are shown in FIG. 17, showing the extremely low strain sensitivity. In fact the wavelength shift is below our measurement accuracy. The estimated strain sensitivity from this measurement is below 0.075 nm/mStrain. The temperature and strain sensitivity are much better than fibre Bragg gratings.

In summary, embodiments of the invention can provide a reproducible and accurate way of tuning the coupling wavelength of a mismatched twin-core filter. This allows fixed wavelength high quality all-fibre band-pass or band-stop filter to be implemented with low loss at any desired wavelength over a range of few hundred nanometres from the same fibre. A 550 nm range tuning is demonstrated, limited only by the measurement setup, not by the technique itself. The highly accurate control of the filtering wavelength in combination with filtering strength control achieved by choosing the length of the twin-core fibres, allows complex band-pass or loss filters to be implemented by putting several of these filters in series. These filters are also highly insensitive to temperature (~0.26 nm/100° C. at 1.55 $\mu$m) and strain (7.8×10$^{-3}$ nm/mStrain at 1.55 $\mu$m), allowing easy and environmental insensitive packaging.

Figure 18:
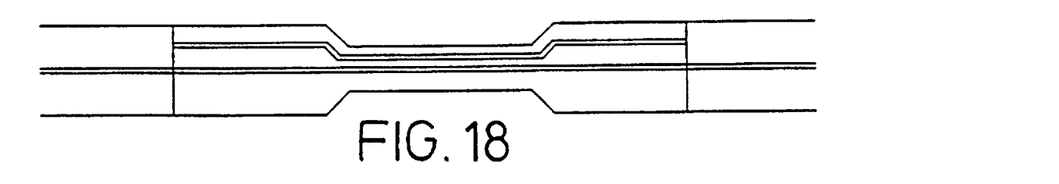
FIG. 18 schematically illustrates a part-radius-reduced twin core fibre filter.

FIG. 18 schematically illustrates a part-radius-reduced twin core fibre filter. A section of the twin-core fibre has been radius-reduced to provide the filtering function.

Figure 19:
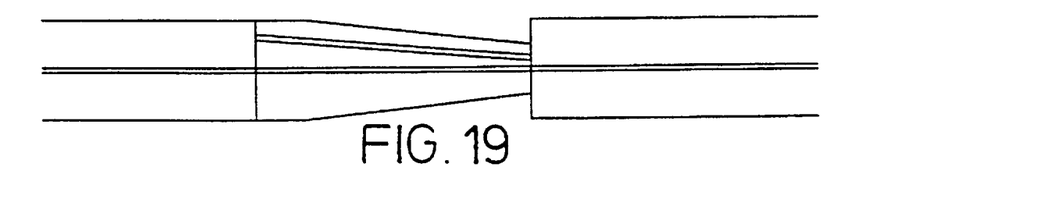
FIG. 19 schematically illustrates a tapered twin core fibre filter.

FIG. 19 schematically illustrates a tapered twin core fibre filter. By providing a varying radius reduction (a taper in this example) along at least a part of the length of the twin core fibre, a broader band filter is obtained. Other taper or radius varying profiles could be used.

Figure 20:
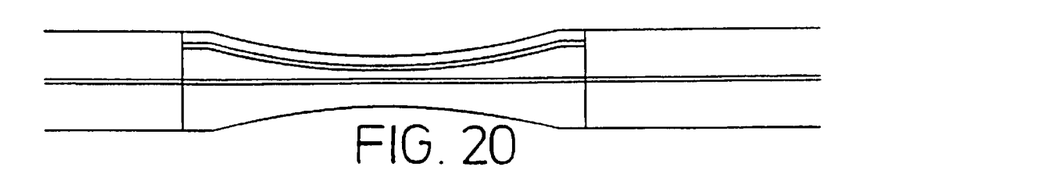
FIG. 20 schematically illustrates an apodised twin core fibre filter.
Figure 21A:
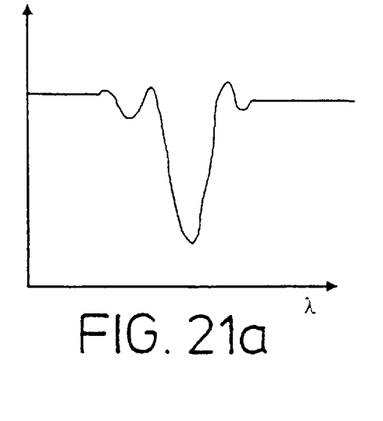
FIGS. 21a and 21b schematically illustrate the effect of the apodisation of FIG. 20.
Figure 21B:
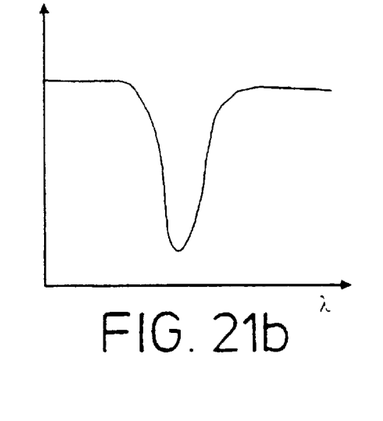
Figure 22:
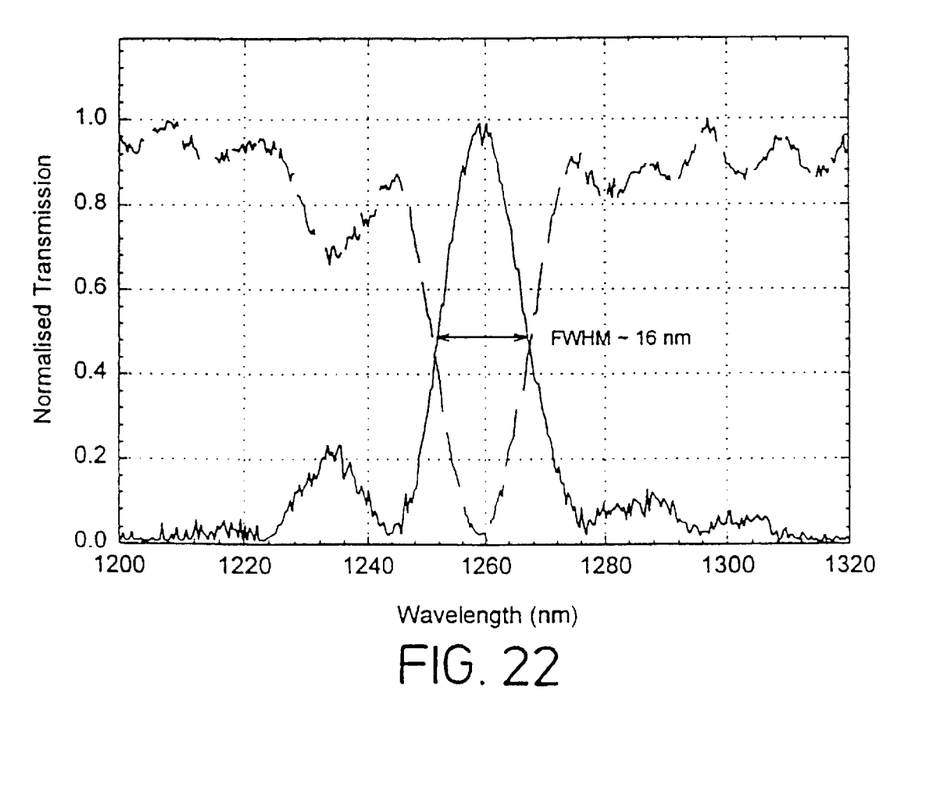
FIG. 22 illustrates a measure response similar to those of FIGS. 4 and 6.

FIG. 20 schematically illustrates an apodised twin core fibre filter. Here the fibre radius is varied according to a curved (non-rectilinear) apodisation profile. The effect of this is illustrated in FIGS. 21a and 21b. FIG. 21a schematically illustrates the response of a filter without apodisation, and FIG. 21b illustrates the corresponding response of an apodised radius filter, to demonstrate a reduction in the side lobes of the response.

In other embodiments, known dopants and pumping arrangements can be used so that the device has a net gain—at least at some wavelengths. In other embodiments, an absorber or gain medium can be applied to only the core into which light is not input—so that the coupled light undergoes attenuation or amplification relative to the non-coupled light.

In further embodiments, more than two cores in the multi-core fibre can be used.

PUBLICATION REFERENCES

1. D. Marcuse, Electronics Letters, 21, pp.726–727, 1985.
2. T. Tjugiarto et al, Electronics Letters, 29, 1077 (1993).
3. G. Grasso et al, Proceedings of Optical Fibre Communication Conference, 195 (1991).
4. L. Dong et al, Journal of Lightwave Technology, 12, 24 (1994).
5. L. Dong et al, IEEE Photonics Technology Letters, 8, 1996, pp. 1656–1658.
6. A. M. Vengsakar et al, Journal of Lightwave Technology, 4, pp.58–65, 1996.
7. J. B. Jiudkins et al, Proceedings of Optical Fibre Communication Conference, PD1, 1996.
8. K. Shima et al, 1997 OSA Technical Digest Series, 6, pp.347–348, 1997.
9. C. E. Lee et al, Optics Letters, 13, pp.1038–1040, 1988.
10. N. P. Bansal et al: "Handbook of Glass Properties", Academic Press, 1986.
11. W. W. Morey et al, Proceedings of SPIE, Self Calibrated Intelligent Optical Sensors and Systems, SPWE-2694, pp.90–98, 1995.

What is claimed is:

1. A method of fabricating an optical fiber filter having a center wavelength $\lambda_0'$, the method comprising:
    (i) radius-reducing a mismatched multi-core optical fiber having a core phase matching wavelength before radius reduction of $\lambda_0$ and a cross-sectional radius before radius reduction of $a_0$, to a reduced $Ra_0$, where $R=\lambda_0'/\lambda_0$; and
    (ii) providing light input and output connections to a section of the radius-reduced multi-core fiber, so that, when input light is launched into one of the cores of the multi-core fiber section, output light emerges from one of the cores of multi-core fiber section.

2. A method according to claim 1, in which the multi-core optical fiber is a twin core fiber.

3. A method according to claim 1, in which the multi-core fiber section is substantially one coupling length long.

4. A method according to claim 1, in which step (ii) comprises:

splicing input and output single core fibers to input and output ends of the multi-core fiber section so that the core of each single core fiber is substantially aligned with one of the cores of the multi-core fiber section.

5. A method according to claim 1, comprising connecting two or more multi-core fiber sections in a series arrangement.

6. A method according to claim 1, in which:

in step (ii), the light input and output connections are provided so that, when input light is launched into one of the cores of the multi-core fiber section, output light emerges from a different one of the cores of the multi-core fiber section.

7. A method according to claim 1, in which:

in step (ii), the light input and output connections are provided so that, when input light is launched into one of the cores of the multi-core fiber section, output light emerges from the same core of the multi-core fiber section.

8. A method according to claim 1, in which the section has a section length substantially equal to an odd integral multiple of a light coupling length between the fiber cores.

9. A method according to claim 1, in which step (i) comprises radius-reducing only a portion of the multi-core optical fiber.

10. A method according to claim 1, in which step (i) comprises radius-reducing the multi-core optical fiber to form a non-uniform radius variation along the multi-core fiber section.

11. A method according to claim 10, in which the non-uniform radius variation forms substantially a linear taper of the multi-core fiber section.

12. A method according to claim 10, in which the non-uniform radius variation forms substantially an apodisation profile of the multi-core fiber section.

13. An optical fiber filter having a center wavelength $\lambda_0'$, the filter comprising:

a mismatched multi-core optical fiber having a cross-sectional radius $a_0$ and a core phase matching wavelength of $\lambda_0$, the multi-core optical fiber having a section of reduced cross-sectional radius $a_0'=Ra_0$ where $R=\lambda_0'/\lambda_0$, R being less than one; and light input and output connections to the multi-core optical fiber section arranged so that, when input light is launched into one of the cores of the multi-core optical fiber section, output light emerges from one of the cores of the multi-core optical fiber section.

14. A filter according to claim 13, in which at least a core of the multi-core optical fiber section is doped with an absorbing or gain medium.

15. An amplifier comprising an amplifier element and one or more filters according to claim 13, in which the composite response of the one or more filters acts to reduce irregularities in the gain response of the amplifier element.

16. A band-pass filter fabricated according to the method of claim 6.

17. A band-stop filter fabricated according to the method of claim 7.

* * * * *